United States Patent
Bottoni et al.

(10) Patent No.: US 11,601,204 B2
(45) Date of Patent: Mar. 7, 2023

(54) LEVERAGING COHERENT DETECTION TO MEASURE PERFORMANCE OF OPTICAL TRANSMITTER

(71) Applicant: Cisco Technology, Inc., San Jose, CA (US)

(72) Inventors: Fabio Bottoni, Milan (IT); Alessandro Cavaciuti, San Donato Milanese (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/378,192

(22) Filed: Jul. 16, 2021

(65) Prior Publication Data

US 2023/0013373 A1    Jan. 19, 2023

(51) Int. Cl.
  *H04B 10/69* (2013.01)
  *H04B 10/61* (2013.01)
  *H04B 10/64* (2013.01)

(52) U.S. Cl.
  CPC ............ *H04B 10/69* (2013.01); *H04B 10/613* (2013.01); *H04B 10/614* (2013.01); *H04B 10/64* (2013.01)

(58) Field of Classification Search
  CPC .... H04B 10/69; H04B 10/613; H04B 10/614; H04B 10/64
  USPC ........................................................ 398/202
  See application file for complete search history.

(56) References Cited

U.S. PATENT DOCUMENTS

| | | | |
|---|---|---|---|
| 9,608,721 B2 * | 3/2017 | Dawe ................... | H04B 10/077 |
| 10,720,995 B1 * | 7/2020 | Mazzini .............. | H04L 25/4917 |
| 2014/0219666 A1 * | 8/2014 | Tselniker ........... | H04B 10/6165 398/208 |
| 2015/0318919 A1 * | 11/2015 | Dawe ....................... | H04L 1/20 398/16 |
| 2018/0123724 A1 * | 5/2018 | Zhang ................. | H04J 14/0257 |

(Continued)

FOREIGN PATENT DOCUMENTS

| WO | 2021036220 A1 | 3/2021 |
|---|---|---|
| WO | 2021092156 A1 | 5/2021 |

(Continued)

OTHER PUBLICATIONS

Kazuro Kikuchi, "Fundamentals of Coherent Optical Fiber Communications", Journal of Lightwave Technology, vol. 34, No. 1, Jan. 1, 2016, 23 pages.

(Continued)

*Primary Examiner* — Abbas H Alagheband
(74) *Attorney, Agent, or Firm* — Edell, Shapiro & Finnan, LLC

(57) ABSTRACT

A method is provided for assessing the quality of an optical transmitter and/or its interoperability with a receiver. The method includes obtaining an optical signal output by an optical transmitter and performing coherent optical-to-electrical detection of the optical signal to produce an in-phase receive signal and a quadrature receive signal. The method further includes a computing device emulating a worst-case configuration of an optical fiber with which the optical transmitter is to be used, based on the in-phase receive signal and the quadrature receive signal to produce a noise contribution associated with the worst-case characteristics of the optical fiber and determining a figure of merit of the optical transmitter based on the noise contribution.

20 Claims, 7 Drawing Sheets

(56) References Cited

U.S. PATENT DOCUMENTS

| | | | | |
|---|---|---|---|---|
| 2019/0383873 | A1* | 12/2019 | Hojabri | G01R 31/3167 |
| 2020/0174514 | A1* | 6/2020 | Amiralizadeh | H04B 10/588 |
| 2021/0021338 | A1* | 1/2021 | Calabrò | H04B 10/61 |
| 2021/0099230 | A1* | 4/2021 | Nishioka | H04B 10/2575 |
| 2021/0305976 | A1* | 9/2021 | Ishii | H03H 17/06 |
| 2022/0182139 | A1* | 6/2022 | Zhang | G01M 11/333 |

FOREIGN PATENT DOCUMENTS

| | | | | |
|---|---|---|---|---|
| WO | WO-2021092156 A1 * | 5/2021 | | H04B 10/0731 |
| WO | WO-2021163534 A1 * | 8/2021 | | G01M 11/335 |

OTHER PUBLICATIONS

David J. Law et al., "IEEE Standard for Ethernet Amendment 4: Physical Layers and Management Parameters for 50 GB/s, 200 GB/s, and 400 GB/s Operation over Single-Mode Fiber", LAN/MAN Standards Committee of the IEEE Computer Society, Approved Nov. 7, 2019, 87 pages.

* cited by examiner

LEVERAGING COHERENT DETECTION TO MEASURE PERFORMANCE OF OPTICAL TRANSMITTER

TECHNICAL FIELD

The present disclosure relates to optical network equipment.

BACKGROUND

To assess quality of an optical transmitter and/or its interoperability with an optical receiver, various performance measurements are performed. For example, a transmitter and dispersion eye closure quaternary (TDECQ) measurement may be used to assess the quality of the optical transmitter. The TDECQ measurement, as currently defined for O-band (1260-1340 nm) applications, requires that the transmitter is tested using an optical channel that meets the worst-case requirements listed in the Table 121-11 of Institute of Electrical and Electronics Engineers (IEEE) 802.3bs. A test device, which includes an optical-to-electrical converter and a scope, receives an optical signal transmitted from the optical transmitter through the worst-case optical fiber and determines the TDECQ value of the optical transmitter.

DESCRIPTION OF EXAMPLE EMBODIMENTS

Overview

According to one embodiment, a method is provided for measuring performance of an optical transmitter. The method includes obtaining an optical signal output by an optical transmitter and performing coherent optical-to-electrical detection of the optical signal to produce an in-phase receive signal and a quadrature receive signal. The method further includes a computing device emulating a worst-case configuration of an optical fiber with which the optical transmitter is to be used, based on the in-phase receive signal and the quadrature receive signal to produce a noise contribution associated with the worst-case configuration of the optical fiber. A figure of merit of the optical transmitter is determined based on the noise contribution. In one example, the figure of merit is a transmitter dispersion eye closure quaternary (TDECQ) value.

Example Embodiments

To assess whether an optical transceiver/transmitter meets a certain quality standard and/or is interoperable with an optical receiver, various measurements are performed using a test device. One performance measurement is a TDECQ value that is defined in the Institute of Electrical and Electronics Engineers (IEEE) section 121.8.5 of IEEE 802.3bs For some applications, such as original band (O-band) of 1260-1340 nm wavelength applications, obtaining the TDECQ measurement may be difficult. One difficulty encountered for these applications is that it is extremely rare to find a G.652 optical fiber, with the worst-case characteristics, as defined by the IEEE standard ($\lambda_0$=1300/1324 nm, see IEEE 802.3 section 121.8.5.2 channel requirements). Another difficulty is possible low power of an optical signal obtained at the receive end of the optical fiber where the test device is provided. For example, for long optical fibers (over 10 kilometers), the power of an optical signal that reaches the test device may be too low i.e., below the sensitivity of the test device. While adding amplifiers along the optical fiber may help increase the optical input power, the amplifiers triggers unwanted effects. O-band optical amplifiers, used as booster amplifiers along the long-reach interconnects, may trigger unwanted nonlinear effects. O-band optical amplifiers, used as pre-amplifiers before an optical-to-electrical (O/E) signal converter, may be limited in terms of a signal-to-noise ratio (SNR). In the case of a praseodymium-doped fiber amplifiers (PDFA), which are characterized by an enhanced performance in comparison to semiconductor optical amplifiers (SOA), coarse wavelength division multiplexing (CWDM) four pulse amplitude modulation (PAM4) interconnects (e.g., 400 GBASE-LR4, LR8, etc.) are not supported due to the PDFA's limited optical bandwidth of 1290-1320 nm.

Presented herein are techniques generally directed to emulating noise contribution of the worst-case fiber in the test device itself as opposed to use in the setup an optical fiber with the worst-case characteristics/configuration.

Figure 1:
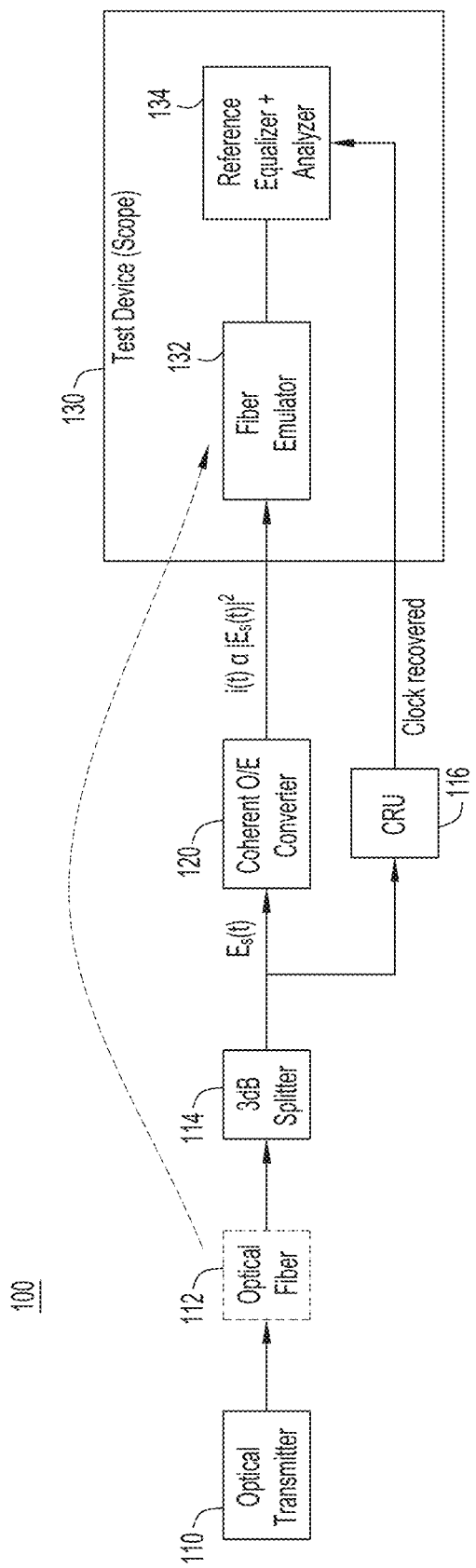
FIG. 1 is a block diagram illustrating an environment in which performance of an optical transmitter is measured, according to an example embodiment.

FIG. 1 is a block diagram illustrating an environment 100 in which performance of an optical transmitter is measured, according to an example embodiment. The environment 100 includes an optical transmitter 110, an optical splitter 114, a clock recovery unit (CRU) 116, a coherent O/E converter (coherent O/E) 120, and a test device (scope) 130.

The optical transmitter 110 is a device under test (DUT) that is tested for compliance by the test device 130. The test device 130 may be a digital oscilloscope apparatus (e.g., a scope). The optical transmitter 110 includes any optical transceiver depending on a use case scenario, such as a physical medium dependent (PMD) optical transmitter. The optical transmitter 110 generates an optical transmit test signal that is typically propagated through an optical channel provided by an optical fiber 112. For compliance testing, the optical fiber 112 is tuned or configured to a worst-case scenario by generating maximum crosstalk e.g., by having all optical channels operating using the same test pattern. The optical splitter 114 (incorporating a variable reflector or a separate variable reflector) is tuned so that the optical test signal experiences a specified level of return loss, as defined in the standard (IEEE section 121.8.5). Next, the optical test signal is propagated through a test fiber (not shown), is received by an optical receiver (not shown), and is measured by the test device 130.

The CRU 116 provides timing information e.g., a corner frequency of 4 MHz and a slope of 20 dB/decade. The CRU 116 may be embodied by a hardware, a software, or a combination of the two depending on the type of the test device 130.

The coherent O/E converter 120 and the test device 130 may be embodied as one device, according to one example embodiment, or as separate devices, according to another example embodiment. Moreover, the coherent O/E converter 120 may be part of a coherent optical receiver, as described further below in connection with FIG. 3. The test device 130 includes a fiber emulator 132 and a reference equalizer and analyzer 134 that may be incorporated as part of the test device 130, or provided as separate devices/functions.

As one example, the optical transmitter 110 may be a 50 Gigabit Ethernet standard specified long reach transmitter (50 GBase LR defined in IEEE 802.3), which outputs an optical signal having an average power (Pavg) of −4 decibel milliwatts (dBm). When the optical signal, propagated through the optical fiber 112, reaches the test device 130, the power of the optical signal may fall below the sensitivity of the test device 130. Additionally, it may be difficult to configure the optical fiber 112 with the worst possible characteristics. Accordingly, the techniques presented herein, omit the optical fiber 112. The techniques presented herein emulate characteristics of the worst-case optical fiber 112 in the test device 130 using the fiber emulator 132, as indicated by the dotted line in FIG. 1.

The coherent O/E converter 120 receives the optical test signal and performs coherent O/E detection of the optical signal. The techniques presented herein use the coherent O/E converter 120 for coherent O/E detection in which the phase information of the optical signal is maintained. The O/E coherent detection scheme maintains the phase and frequency information of the optical signal so that any chirp characteristics of an optical transmitter 110 is accounted in emulating the optical fiber 112 by the fiber emulator 132.

The test device 130 captures the complete pattern of the converted test signal (samples from all symbols in a complete pattern). The fiber emulator 132 numerically emulates the worst-case characteristics of the optical fiber 112. Because all the noise contribution of the fiber is known e.g., provided by the standard, the fiber emulator 132 can numerically/digitally emulate the noise contributions of the optical fiber 112. Since the fiber emulator 132 produces the noise contribution of the optical fiber 112 (a numeric value that represents the noise contributions), a low power optical power at the test device 130 (caused by propagation through the optical fiber 112) is not an issue.

The reference equalizer and analyzer 134 may detect performance of the optical transmitter 110 based on the noise contribution provided by the fiber emulator 132. The reference equalizer and analyzer 134 computes a figure of merit that represents the quality of the optical transmitter 110. As one example, the reference equalizer and analyzer 134 computes the TDECQ value of the optical transmitter 110 and may optimize the SNR of a captured waveform to open the eye of the receive waveform to improve TDECQ measurement.

Figure 2:
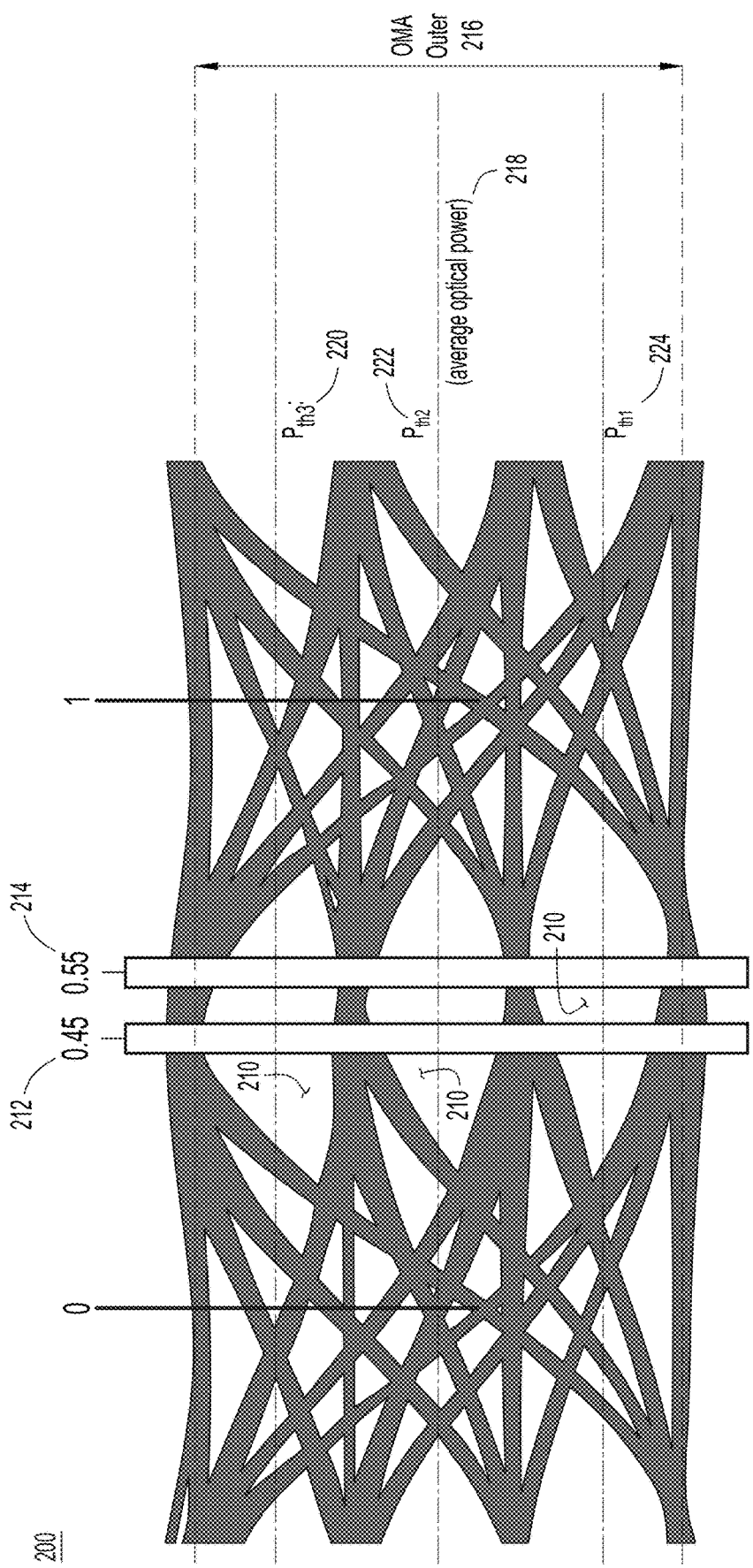
FIG. 2 is a diagram illustrating a TDECQ measurement for which the techniques presented herein may be employed, according to an example embodiment.

FIG. 2 illustrates a TDECQ measurement 200 obtained with the test device 130 of FIG. 1, according to an example embodiment.

In a typical telecommunications and/or data communications network, an optical transmitter, an optical fiber, and an optical receiver might be produced by different vendors. To enable and facilitate the interoperability between these various devices, main building blocks of the system are separately specified such that even in the worst-case scenario, the link can be closed, and a tolerable bit-error-ratio (BER) can be achieved.

The TDECQ measurement 200 is a quality indicator for a DUT and characterizes the performance of the DUT in reference conditions. The reference conditions are a test fiber (not shown) and a specified receiver. For example, the TDECQ measurement 200 is an optical power penalty of the optical transmitter 110 compared to an ideal transmitter. It measures the increase of optical power required for the optical transmitter to achieve the same eye opening as the ideal optical transmitter. The lower the TDECQ measurement 200, the higher (better) the performance/figure of merit of the optical transmitter 110. The TDECQ measurement 200 is compared to a threshold value to determine compliance with a standard and/or interoperability with a receiver. If the TDECQ measurement 200 is above the threshold value, then the optical transmitter 110 is not meeting quality control (performance required by a standard) and may be defective, may need a configuration adjustment, or may need a redesign. On the other hand, if the TDECQ measurement 200 is below the threshold value, the optical transmitter 110 is compliant with the standard and may be configured to transmit optical signals. If the optical transmitter 110 meets the standard, a compliant optical receiver should be interoperable with the optical transmitter 110.

The TDECQ measurement 200 includes two vertical histograms (left histogram 212 and right histogram 214) that span through all of the modulation levels of an eye 210 of the waveform. In this use case scenario, the left histogram 212 is located at 0.45 UI and the right histogram 214 is located at 0.55 UI from the waveform's average crossing time. The sub-eye threshold levels Pth1, Pth2, and Pth3, are computed from an Optical Modulation Amplitude with a PAM4 signal level 0 through level 3 (OMAouter) 216 and the average optical power of the eye diagram ($P_{ave}$) 218, as follows:

Pth3=Pave+OMAouter/3, shown at 220.
Pth2=Pave, shown at 222.
Pth1=Pave−OMAouter/3, shown at 224.

The TDECQ value is computed as: $10\log_{10}$ (OMAouter/6*1/$Q_t$R), where $Q_t$ is a Q-scale value for the target symbol error rate (SER) and R is noise added to the optical test signal generated by optical transmitter 110 to achieve the target SER.

Using these computations, it can be seen that the TDECQ measurement 200 is a measure of an optical transmitter's vertical eye closure that includes noise contributions of the optical fiber connected to the optical transmitter.

Figure 3:
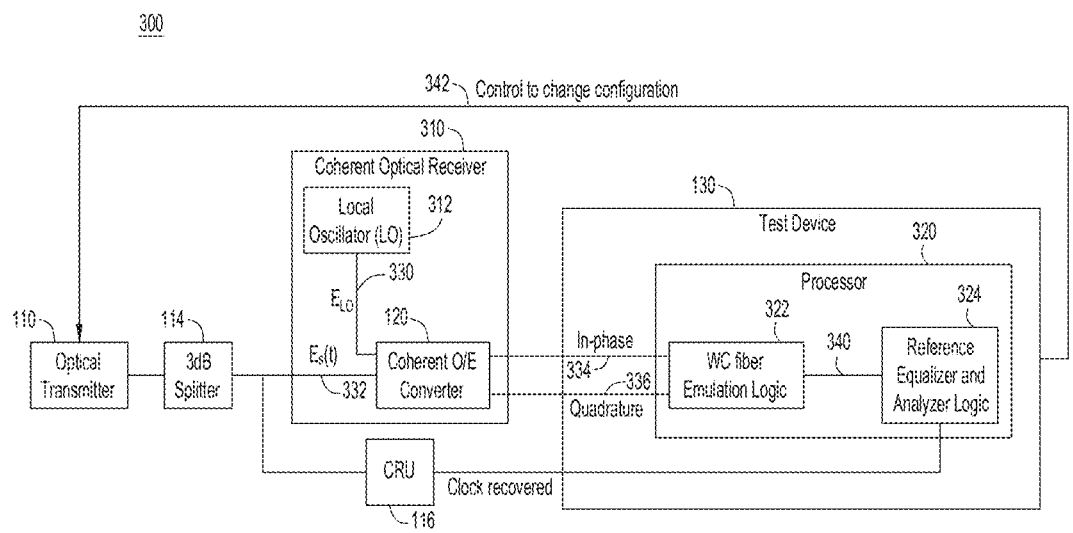
FIG. 3 is a block diagram illustrating an environment in which configuration of an optical transmitter is changed based on a measured performance of the optical transmitter, according to an example embodiment.

FIG. 3 is a block diagram illustrating the environment 300 in which configuration of the optical transmitter 110 is changed based on a measured performance of the optical transmitter 110, according to an example embodiment. The environment 300 includes the optical transmitter 110, the splitter 114, a coherent optical receiver 310, and the test device 130. The coherent optical receiver 310 includes the coherent O/E converter 120 and a local oscillator (LO) 312 that generates a local oscillator signal ($E_{LO}$). The test device 130 includes a processor 320 that executes instructions for worst-case fiber emulation logic 322 and instructions for reference equalizer and analyzer logic 324.

The WC fiber emulation logic 322 emulates the worst-case configuration of an optical fiber with which the optical transmitter 110 is to be used based on the in-phase receive signal and the quadrature receive signal. In one example, the characteristic of the optical fiber is a dispersion parameter D (ps/nm*km), which is function of the signal wavelength λ. The worst-case values are the maximum and minimum values of the dispersion parameter D, which are specified in a relevant IEEE standard e.g. IEEE 802.3cn for the 50 GBASE-LR/ER application.

The reference equalizer and analyzer logic 324 determines a figure of merit that represents the quality or performance of the optical transmitter, based on the computed noise contribution. For example, the reference equalizer and analyzer logic 324 computes a TDECQ value defined by the standard IEEE 802.3 section 121.8.5.

The optical transmitter 110 generates an optical transmit signal. The optical transmit signal is split by the splitter 114 and is input to the CRU 116 and the coherent optical receiver 310. Without phase and frequency information of the optical signal, the fiber emulator 132 is only able to emulate a linear model of interaction, which would not account for the noise contribution of the chirp characteristics of the optical transmitter 110. The coherent optical receiver 310 is able to retain phase and frequency information.

Specifically, the coherent O/E converter 120 obtains the locally oscillated frequency (ELo) at 330 and an optical signal Es(t) at 332 obtained from an output of the splitter 114. The coherent O/E converter 120 mixes the local oscillator signal $E_{LO}$ with the optical signal Es(t) to output an in-phase receive signal at 334 and a quadrature receive signal 336. By adopting this coherent O/E detection scheme, the phase and frequency information of the optical signal is maintained.

At 340, the WC fiber emulation logic 322 outputs a numeric value that represent computed noise contribution associated with the worst-case configuration of the optical fiber (such as the dispersion parameter D). That is, the WC fiber emulation logic 322 accounts for the chirp of the optical transmitter 110.

The reference equalizer and analyzer logic 324 executed by the processor 330 may be further configured to compare the figure of merit (e.g., the TDECQ value) to a threshold value to determine whether performance of the optical transmitter is compliant. At 342, based on the processor 330 determining that the performance of the optical transmitter does not meet a compliance value, a control operation may be performed to change the configuration of the optical transmitter 110. For example, the optical transmitter 110 with "settings A" could lead to a measured TDECQ value above the threshold value meaning that the performance is poor and compliance is not achieved. Using the control configuration change 342, the optical transmitter 110 settings could be tuned and optimized (iteratively) until the measured TDECQ value is within the threshold value or compliant.

Figure 4:
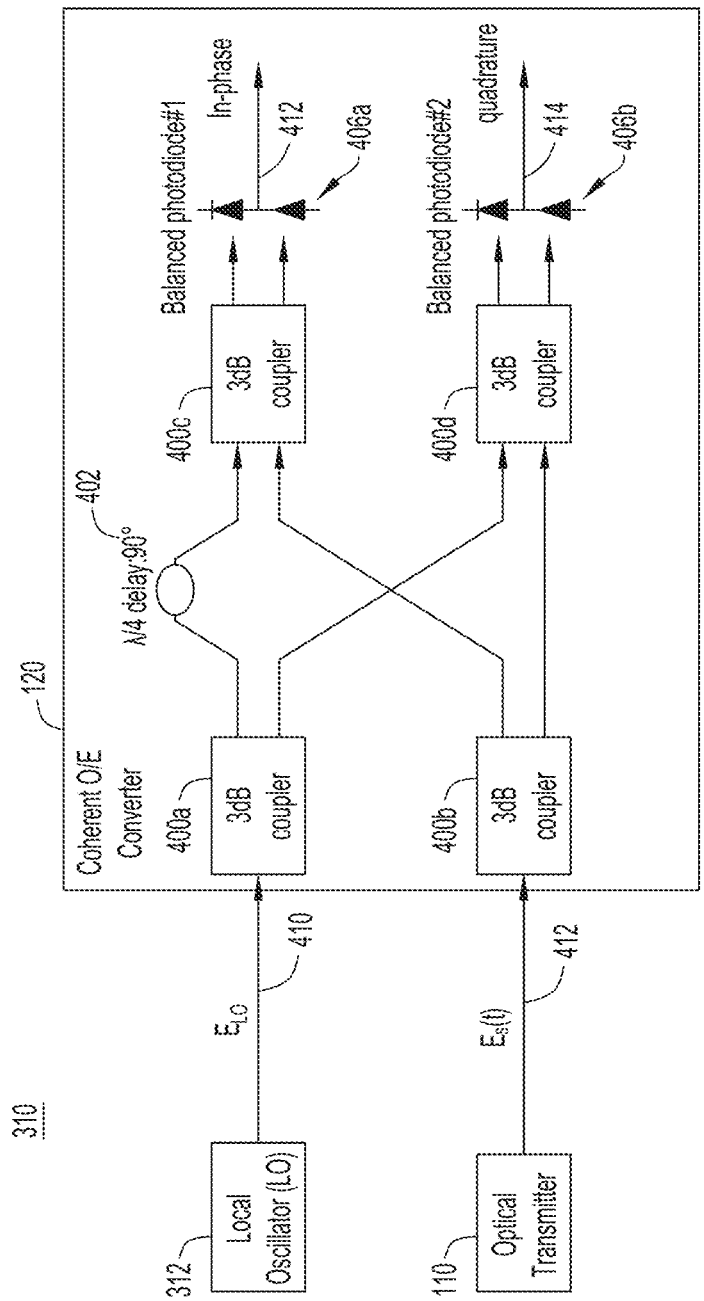
FIG. 4 is a block diagram illustrating components of a coherent optical receiver that are used to derive a performance measurement of an optical transmitter, according to an example embodiment.

FIG. 4 is a block diagram illustrating components of the coherent optical receiver 310 configured to perform coherent detection, according to an example embodiment. The coherent optical receiver 310 includes the local oscillator 312 and the coherent O/E converter 120.

The local oscillator 312 may be a continuous-wave (CW) tunable laser in an O-band (1260-1340 nm) in one example. According to one example embodiment, the coherent O/E converter 120 includes four couplers 400a-d, a delay unit 402, and two balanced photodiodes 406a-b. The four couplers 400a-d are 3 dB couplers that split or distribute an optical input signal into two output signals. The delay unit 402 is configured to introduce a 90 degrees phase shift (λ/4 delay). Each of the two balanced photodiodes 406a-b include two diodes that convert optical signals to electrical signals, and output a difference of these the two electrical signals.

At 410, the local oscillator 312 continuously provides, as input into the coherent O/E converter 120, local oscillator signal $E_{LO}$. At 412, the transmit (test) optical signal Es(t), generated by the optical transmitter 110, is input into the coherent O/E converter 120. The first coupler 400a splits the local oscillator signal $E_{LO}$ into two outputs and the second coupler 400b splits the optical signal Es(t) into two outputs. The third coupler 400c receives, the local oscillator signal $E_{LO}$, shifted by 90 degrees by the delay unit 402, and one output from the second coupler 400b. The fourth coupler 400d receives the local oscillator signal $E_{LO}$ and the other output from the second coupler 400b.

The third coupler 400c splits the inputs into two outputs (one for each diode of the first balanced photodiode 406a) and at 412, the first balanced photodiode 406a outputs an in-phase receive signal.

The fourth coupler 400d splits the inputs into two outputs and at 414, the second balanced diode 406b outputs the quadrature receive signal. By mixing the optical signal Es(t) with the local oscillator signal $E_{LO}$ of the local oscillator 312, the phase information (included in the in-phase and quadrature receive signals) is extracted. The coherent O/E converter 120 may be based on a 90° hybrid phase-diversity architecture and converts the optical signal to electrical signals while maintaining phase and frequency information of the optical signal.

Figure 5:
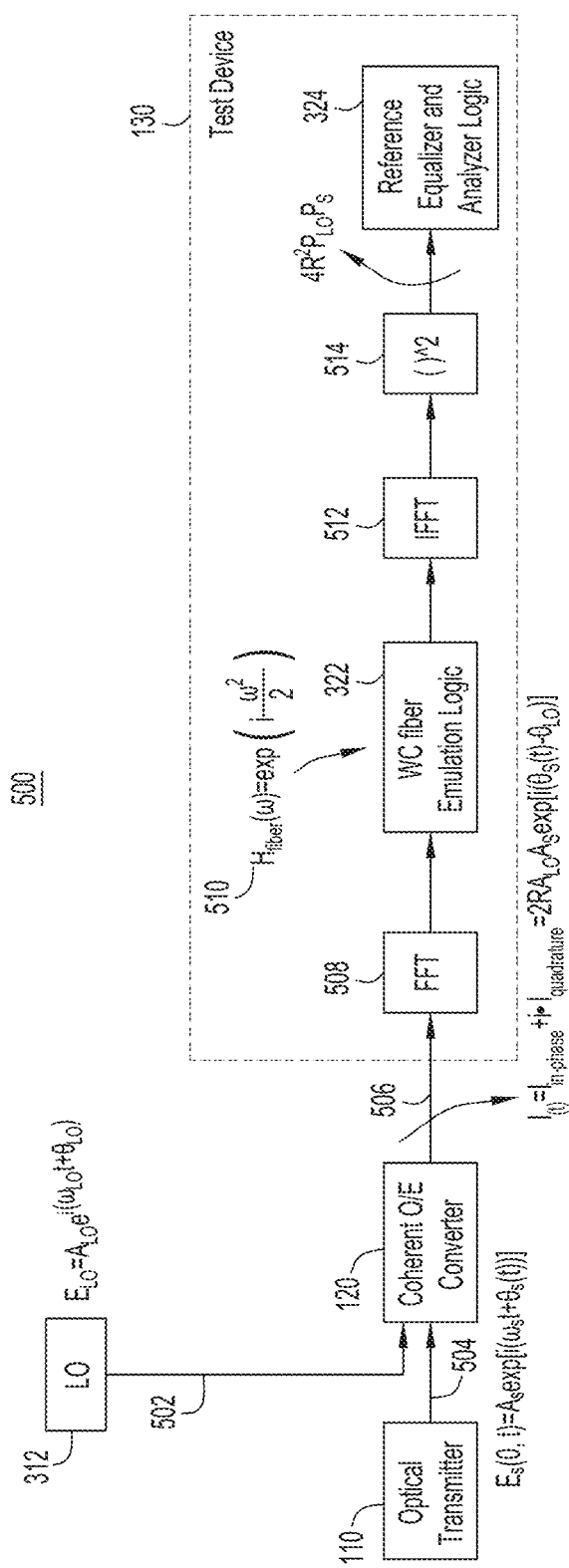
FIG. 5 is a flow diagram illustrating a method of calculating noise contributions associated with the worst-case configuration of an optical fiber, according to an example embodiment.

FIG. 5 is a flow diagram illustrating a method 500 of calculating noise contributions associated with the worst-case characteristics of an optical fiber to be used with the optical transmitter 110, according to an example embodiment.

The method 500 involves at 502, the local oscillator 312 continuously providing, to the coherent O/E converter 120, a local oscillator optical signal $E_{LO}$, which may be expressed as $A_{LO}e^{i(\omega_{LO}t+\theta_{LO})}$. The optical transmitter 110 generates a transmit optical signal Es(0, t), which is the test signal to assess quality and compliance of the optical transmitter 110. Specifically, at 504, the coherent O/E converter 120 obtains the transmit optical signal Es(0, t), which is expressed as $A_s\exp[i(\omega_s t+\theta_s(t))]$, described in the IEEE standard 802.3, in which θs(t) is a phase parameter that models a chirp contribution/characteristic of the optical transmitter 110. It is assumed that $\omega_s=\omega_{LO}$ (for homodyne detection) and the two are polarization aligned.

The coherent O/E converter 120 is a 90° phase diversity converter that processes the optical signals $E_{LO}$ and Es(t), as described in FIG. 4. At 506, the coherent O/E converter 120 outputs a receive signal I(t) that includes an in-phase receive signal component $I_{in\text{-}phase}$, which is expressed as $RA_sA_{LO}Re\{e^{i\Delta\theta}\}$ and a quadrature receive signal component $I_{quadrature}$, which is expressed as $RA_sA_{LO}Im\{e^{i\Delta\theta}\}$, where Δθ is equal to $\theta_S-\theta_{LO}$, where $A_s$ is the amplitude of the transmit optical signal Es(0,t) and $A_{LO}$ is the amplitude of the local oscillator signal $E_{LO}$ and R is a photodiode responsivity factor of the photodiodes in the coherent O/E converter 120 (FIG. 4). The receive signal I(t) may be expressed as $I(t)=I_{in\text{-}phase}+i\cdot I_{quadrature}=2RA_{LO}A_S\ \exp[i(\theta_S(t)-\theta_{LO})]$. Again, the receive signal I(t) output by the coherent O/E converter 120 includes $\theta_S$, indicating that the chirp characteristics of the optical transmitter 110 is maintained.

At 508, the received signal I(t) is converted in a frequency domain using Fast Fourier Transform (FFT).

At 510, the WC fiber emulation logic 322 (running inside by the test device 130) emulates a noise contribution of the worst-case optical fiber. In particular, the noise contribution of an optical fiber is chromatic dispersion. Due to the chromatic dispersion, different spectral components of the optical signal travel at different group velocities. The chromatic dispersion of an optical fiber can be modeled (in a frequency domain) as a filter with the following response: $H_{fiber}(\omega) = \exp(i\,(-D\lambda^2 L\omega^2)/4\pi c)$, where $\omega$ is the angular frequency, L is the length of the fiber (km), D is a dispersion parameter (ps/nm*km), $\lambda$ is the central wavelength of the optical signal, c is the light velocity constant.

At 512, the signal output by the WC fiber emulation logic 322 is converted back to the time domain using an Inverse FFT (IFFT) to produce a time domain signal. At 514, the time domain signal output by the IFFT operation is squared according to the computation $4R^2\,P_{LO}P_S$, where $P_{LO}$ is the power of the local oscillator signal and $P_S$ is the power of the receive signal. The output of the power computation of step 514 is provided to the reference equalizer and analyzer logic 334 to determine a figure of merit of the optical transmitter 110.

The local oscillator 312 contributes to a more accurate discrimination of the noise contributions provided by the optical transmitter 110 and by the emulated optical fiber. For example, direct detection TDECQ has a signal contribution of $R^2 P_s^2$, where R and Ps are defined above and a photodiode noise of $I_{(shot)} = \sqrt{2qRP_s \cdot BW}$. In this case, Ps is about −10 dBm. On the other hand, a coherent TDECQ of the techniques presented herein has a signal contribution of $4R^2 P_{LO} P_s$, where $P_{LO}$ is the power of the local oscillator signal provided by the local oscillator 312 and the photodiode noise $I_{(shot)} = \sqrt{4qR(P_s + P_{LO} + 2\sqrt{P_s P_{LO}}) \cdot BW}$. In this case, Ps is about 0 dBm and $P_{LO}$ is about 3 dBm. As a result, the SNR is discriminated more accurately using coherent TDECQ.

The techniques presented above employ a coherent O/E detection scheme that maintains signal phase information (chirp characteristics of the optical transmitter) such that when emulating the worst-case fiber contributions, the chromatic dispersion is taken into account. Instead of requiring the use of an optical fiber, such as for long-reach interconnects of 10 km or greater, to be configured with worst-case characteristics, the techniques presented above emulate the worst-case fiber noise contribution after the optical signal is converted to an electrical signal. Assessments of the quality and the interoperability of optical transmitters, such as TDECQ measurements, may thus be achieved with much less complexity and cost than otherwise possible.

Figure 6:
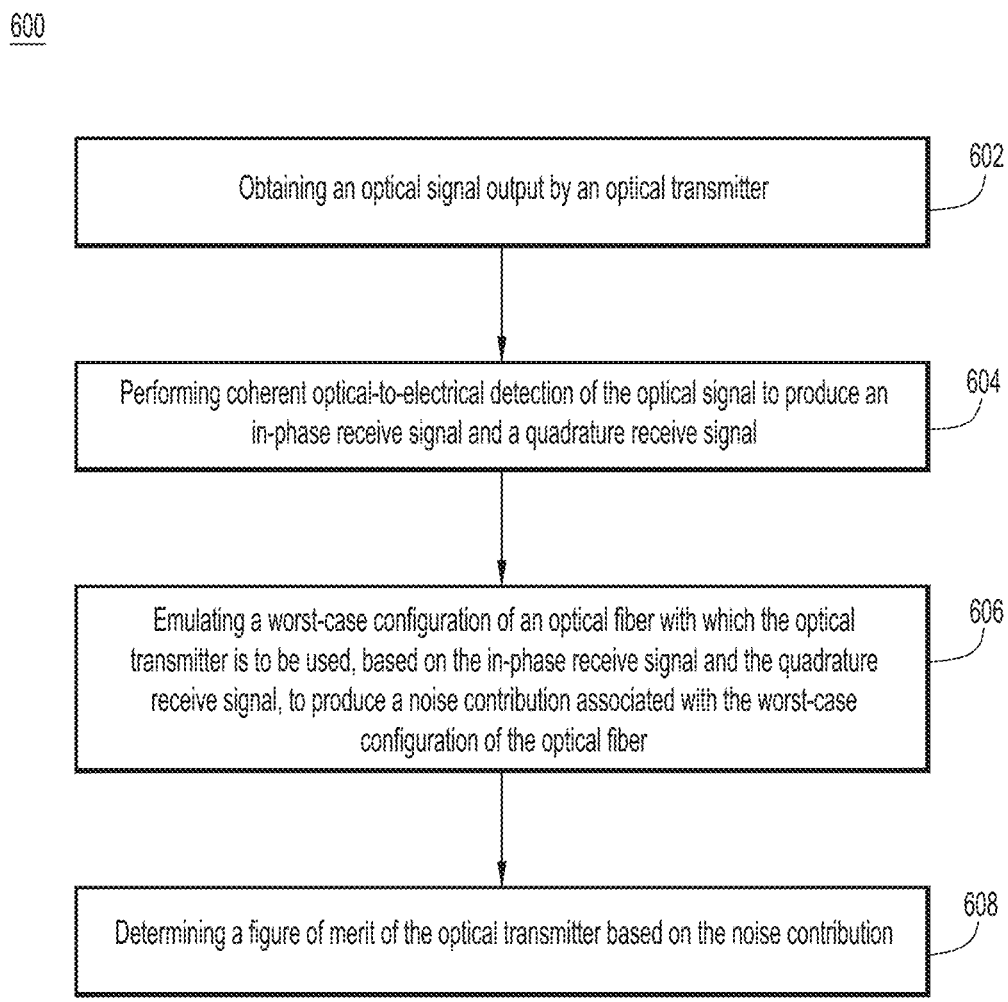
FIG. 6 is a flowchart of a method of determining a figure of merit of an optical transmitter, according to an example embodiment.

FIG. 6 is a flowchart illustrating a method 600 of determining a figure of merit of an optical transmitter using the techniques described herein, according to an example embodiment. The method 600 is performed by a test device, such as the test device 130 shown in FIGS. 1 and 3-5, which may be embodied as a single device or separate devices.

At 602, the method 600 involves obtaining an optical signal output by an optical transmitter.

At 604, the method 600 involves performing coherent optical-to-electrical detection of the optical signal to produce an in-phase receive signal and a quadrature receive signal. The operation 604 may be performed by the coherent O/E converter 120 of FIGS. 1 and 3-5.

At 606, a computing device (e.g., test device) emulates a worst-case configuration of an optical fiber with which the optical transmitter is to be used, based on the in-phase receive signal and the quadrature receive signal, to produce a noise contribution associated with the worst-case configuration of the optical fiber. The computing device is the test device (scope) 130 of FIGS. 1 and 3-5.

At 608, the method 600 involves the computing device determining a figure of merit of the optical transmitter based on the noise contribution.

In one form, the figure of merit may be a transmitter dispersion eye closure quaternary (TDECQ) value.

According to one or more example embodiments, the method 600 may further involve comparing the TDECQ value to a threshold to determine whether performance of the optical transmitter meets a compliance value, and based on determining that the performance of the optical transmitter does not meet the compliance value, changing a configuration of the optical transmitter.

In one instance, the operation 606 of emulating the worst-case configuration of the optical fiber may include deriving a chirp contribution/characteristic associated with the optical transmitter based on the in-phase receive signal and the quadrature receive signal.

According to one or more example embodiments, the method 600 may further involve storing information representing the chirp contribution of the optical transmitter.

In another example, the operation 606 of emulating the worst-case configuration of the optical fiber may include computing the noise contribution based on a known characteristic of the worst-case configuration of the optical fiber and the chirp contribution of the optical transmitter.

In yet another example, the operation 606 of emulating the worst-case configuration of the optical fiber may further include obtaining the worst-case configuration of the optical fiber. The worst-case configuration may include a chromatic dispersion parameter value for the optical fiber. The operation 606 may further include computing the noise contribution based on the chromatic dispersion parameter value and a central wavelength of the optical signal.

According to one or more example embodiments, the noise contribution may be computed according to an equation:

$$H_{fiber}(\omega) = \exp\left(i\frac{-D\lambda^2 L\omega^2}{4\pi c}\right),$$

where $\omega$ is an angular frequency, L is a length of the fiber in kilometers, D is the chromatic dispersion parameter value, $\lambda$ is the central wavelength of the optical signal, and c is a light velocity constant.

Figure 7:
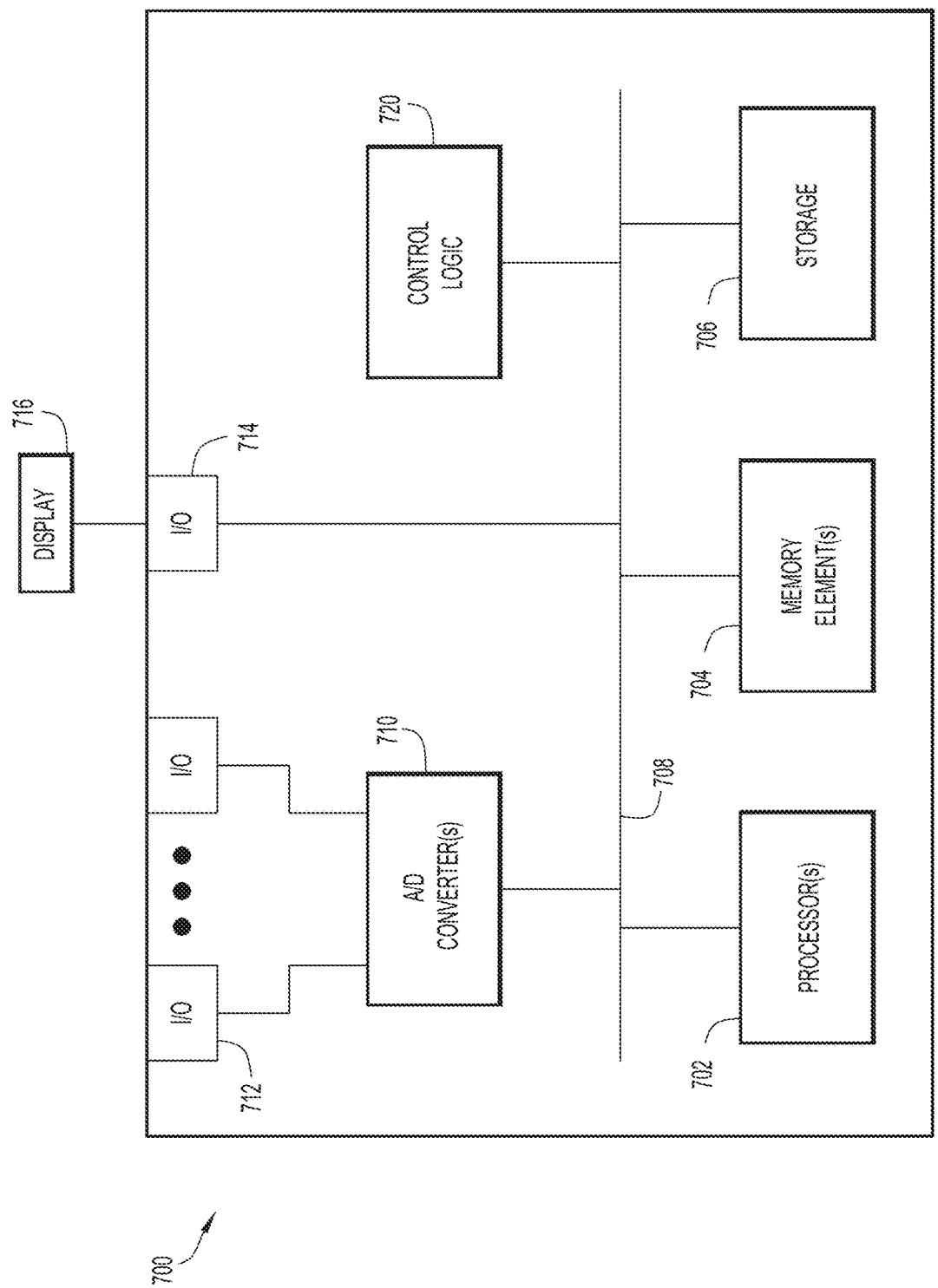
FIG. 7 is a hardware block diagram of an apparatus that may perform operations depicted in any one or more of FIGS. 1-6, according to an example embodiment.

FIG. 7 is a hardware block diagram of a computing device 700 that may perform functions associated with operations discussed herein in connection with the techniques depicted in any one or more of FIGS. 1-6. In various embodiments, any of digital oscilloscope or test device discussed above may implement a computing architecture analogous to that described below with respect to FIG. 7.

In at least one embodiment, the computing device 700 may include one or more hardware processor(s) 702, one or more memory element(s) 704, storage 706, a bus 708, one or more analog-to-digital (A/D) converter(s) 710 interconnected with one or more input port(s) 712, one or more I/O interface(s) 714, or control logic 720. In various embodiments, instructions associated with logic for computing device 700 can overlap in any manner and are not limited to the specific allocation of instructions and/or operations described herein. The A/D converter(s) 710 may be used to convert analog electrical signals, such the in-phase receive signal and the quadrature receive signal, from the coherent O/E converter 120 (FIGS. 1 and 3-5) to digital signals for perform the operations described above in connection with FIGS. 5 and 6. The instructions for the WC fiber emulation logic 322, the reference equalizer and analyzer logic 324 as well as instructions to perform the FFT operation 508, the IFFT operation 512 and the power computation 514, may be included in the control logic 720.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that are configured for computing device 700. In at least one embodiment, bus 708 is implemented as a fast kernel-hosted interconnect, potentially using shared memory between processes (e.g., logic), which can enable efficient communication paths between the processes.

In various embodiments, input ports 712 can be configured as one or more Ethernet port(s), Fibre Channel ports, any other I/O port(s), now known or hereafter developed. Thus, the input port(s) 712 may be suitable for receiving data and/or information.

I/O interface(s) 714 allow for input and output of data and/or information with other peripheral devices that are connected to computing device 700, such as the display 716. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 700 serves as a user device as described herein. In some embodiments, the computing device 700 supports the display 716 having touch-screen display capabilities and configured to display performance measurements by way of an example.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, a method is provided comprising: obtaining an optical signal output by an optical transmitter; performing coherent optical-to-electrical detection of the optical signal to produce an in-phase receive signal and a quadrature receive signal; emulating, by a computing device, a worst-case configuration of an optical fiber with which the optical transmitter is to be used, based on the in-phase receive signal and the quadrature receive signal to produce a noise contribution associated with the worst-case configuration of the optical fiber; and determining, by the computing device, a figure of merit of the optical transmitter based on the noise contribution.

In another example embodiment, an apparatus is provided. The apparatus includes a coherent optical receiver, such as the coherent optical receiver 310 of FIG. 3. The coherent optical receiver is configured to receive an optical signal from an optical transmitter and to perform coherent optical-to-electrical detection of the optical signal to produce an in-phase receive signal and a quadrature receive signal. The apparatus further includes a computing device, such as the test device 130. The computing device is coupled to the coherent optical receiver. The computing device is configured to emulate a worst-case configuration of an optical fiber with which the optical transmitter is to be used, based on the in-phase receive signal and quadrature receive signal to produce a noise contribution associated with the worst-case configuration of the optical fiber. The computing device is further configured to determine a figure of merit of the optical transmitter based on the noise contribution.

In yet another example embodiment, one or more non-transitory computer readable storage media are provided that are encoded with instructions that, when executed, configure a coherent optical receiver and a computing device to perform operations which include: obtaining, via the coherent optical receiver, an optical signal output by an optical transmitter and performing, by the coherent optical receiver, coherent optical-to-electrical detection of the optical signal to produce an in-phase receive signal and a quadrature receive signal. The operations further include emulating, by the computing device, a worst-case configuration of an optical fiber with which the optical transmitter is to be used, based on the in-phase receive signal and the quadrature receive signal to produce a noise contribution associated with the worst-case configuration of the optical fiber and determining a figure of merit of the optical transmitter based on the noise contribution.

In yet another example embodiment, a system is provided that includes the devices and operations explained above with reference to FIGS. 1-6.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining an optical signal output by an optical transmitter;
   performing coherent optical-to-electrical detection of the optical signal to produce an in-phase receive signal and a quadrature receive signal;
   emulating, by a computing device, a worst-case configuration of an optical fiber with which the optical transmitter is to be used, based on the in-phase receive signal and the quadrature receive signal to produce a noise contribution associated with the worst-case configuration of the optical fiber, wherein emulating the worst-case configuration of the optical fiber includes deriving a chirp contribution associated with the optical transmitter based on the in-phase receive signal and the quadrature receive signal; and
   determining, by the computing device, a figure of merit of the optical transmitter based on the noise contribution.

2. The method of claim 1, wherein the figure of merit is a transmitter dispersion eye closure quaternary (TDECQ) value.

3. The method of claim 2, further comprising:
   comparing the TDECQ value to a threshold to determine whether performance of the optical transmitter meets a compliance value; and
   based on determining that the performance of the optical transmitter does not meet the compliance value, changing a configuration of the optical transmitter.

4. The method of claim 1, further comprising:
   storing information representing the chirp contribution of the optical transmitter.

5. The method of claim 4, wherein emulating the worst-case configuration of the optical fiber includes:
   computing the noise contribution based on a known characteristic of the worst-case configuration of the optical fiber and the chirp contribution of the optical transmitter.

6. The method of claim 1, wherein emulating the worst-case configuration of the optical fiber further includes:
   obtaining the worst-case configuration of the optical fiber, wherein the worst-case configuration includes a chromatic dispersion parameter value for the optical fiber; and
   computing the noise contribution based on the chromatic dispersion parameter value and a central wavelength of the optical signal.

7. The method of claim 6, wherein the noise contribution is computed according to an equation:

$$H_{fiber}(\omega) = \exp\left(i\frac{-D\lambda^2 L\omega^2}{4\pi c}\right),$$

wherein $\omega$ is an angular frequency, L is a length of the optical fiber in kilometers, D is the chromatic dispersion parameter value, $\lambda$ is the central wavelength of the optical signal, and c is a light velocity constant.

8. An apparatus comprising:
   a coherent optical receiver configured to receive an optical signal from an optical transmitter and to perform coherent optical-to-electrical detection of the optical signal to produce an in-phase receive signal and a quadrature receive signal; and
   a computing device coupled to the coherent optical receiver, the computing device configured to:
      emulate a worst-case configuration of an optical fiber with which the optical transmitter is to be used, based on the in-phase receive signal and quadrature receive signal to produce a noise contribution associated with the worst-case configuration of the optical fiber by deriving a chirp contribution associated with the optical transmitter based on the in-phase receive signal and the quadrature receive signal, and determine a figure of merit of the optical transmitter based on the noise contribution.

9. The apparatus of claim 8, wherein the figure of merit is a transmitter dispersion eye closure quaternary (TDECQ) value.

10. The apparatus of claim 9, wherein the computing device is further configured to:
compare the TDECQ value to a threshold to determine whether performance of the optical transmitter meets a compliance value; and
based on determining that the performance of the optical transmitter does not meet the compliance value, change a configuration of the optical transmitter.

11. The apparatus of claim 8, wherein the computing device is further configured to:
store information representing the chirp contribution of the optical transmitter.

12. The apparatus of claim 11, wherein the computing device is configured to emulate the worst-case configuration of the optical fiber by:
computing the noise contribution based on a known characteristic of the worst-case configuration of the optical fiber and the chirp contribution of the optical transmitter.

13. The apparatus of claim 8, wherein the computing device is configured to emulate the worst-case configuration of the optical fiber by:
obtaining the worst-case configuration of the optical fiber, wherein the worst-case configuration includes a chromatic dispersion parameter value for the optical fiber; and
computing the noise contribution based on the chromatic dispersion parameter value and a central wavelength of the optical signal.

14. The apparatus of claim 13, wherein the computing device computes the noise contribution according to an equation:

$$H_{fiber}(\omega) = \exp\left(i\frac{-D\lambda^2 L\omega^2}{4\pi c}\right),$$

wherein $\omega$ is an angular frequency, L is a length of the optical fiber in kilometers, D is the chromatic dispersion parameter value, $\lambda$ is the central wavelength of the optical signal, and c is a light velocity constant.

15. One or more non-transitory computer readable storage media comprising instructions that when executed configure a coherent optical receiver and a computing device to perform operations comprising:
obtaining, by the coherent optical receiver, an optical signal output by an optical transmitter;
performing, via the coherent optical receiver, coherent optical-to-electrical detection of the optical signal to produce an in-phase receive signal and a quadrature receive signal;
emulating, by the computing device, a worst-case configuration of an optical fiber with which the optical transmitter is to be used, based on the in-phase receive signal and the quadrature receive signal to produce a noise contribution associated with the worst-case configuration of the optical fiber, wherein emulating the worst-case configuration of the optical fiber includes deriving a chirp contribution associated with the optical transmitter based on the in-phase receive signal and the quadrature receive signal; and
determining a figure of merit of the optical transmitter based on the noise contribution.

16. The one or more non-transitory computer readable storage media of claim 15, wherein the figure of merit is a transmitter dispersion eye closure quaternary (TDECQ) value.

17. The one or more non-transitory computer readable storage media of claim 16, wherein the operations further comprise:
comparing the TDECQ value to a threshold to determine whether performance of the optical transmitter meets a compliance value; and
based on determining that the performance of the optical transmitter does not meet the compliance value, changing a configuration of the optical transmitter.

18. A method comprising:
obtaining an optical signal output by an optical transmitter;
performing coherent optical-to-electrical detection of the optical signal to produce an in-phase receive signal and a quadrature receive signal;
emulating, by a computing device, a worst-case configuration of an optical fiber with which the optical transmitter is to be used, based on the in-phase receive signal and the quadrature receive signal to produce a noise contribution associated with the worst-case configuration of the optical fiber;
determining, by the computing device, a figure of merit of the optical transmitter based on the noise contribution, wherein the figure of merit is a transmitter dispersion eye closure quaternary (TDECQ) value;
comparing the TDECQ value to a threshold to determine whether performance of the optical transmitter meets a compliance value; and
based on determining that the performance of the optical transmitter does not meet the compliance value, changing a configuration of the optical transmitter.

19. The method of claim 18, wherein emulating the worst-case configuration of the optical fiber includes:
obtaining the worst-case configuration of the optical fiber, wherein the worst-case configuration includes a chromatic dispersion parameter value for the optical fiber; and
computing the noise contribution based on the chromatic dispersion parameter value and a central wavelength of the optical signal.

20. The method of claim 18, wherein emulating the worst-case configuration of the optical fiber includes:
computing the noise contribution based on a known characteristic of the worst-case configuration of the optical fiber, the in-phase receive signal, and the quadrature receive signal.

* * * * *